US008134949B2

(12) United States Patent
Ruuska et al.

(10) Patent No.: US 8,134,949 B2
(45) Date of Patent: Mar. 13, 2012

(54) EFFICIENT USE OF THE RADIO SPECTRUM

(75) Inventors: Paivi M. Ruuska, Tampere (FI); Arto Palin, Viiala (FI); Jukka Reunamaki, Tampere (FI); Kimmo H. J. Kalliola, Helsinki (FI); Juha O. Juntunen, Espoo (FI)

(73) Assignee: Nokia Corporation, Espoo (FI)

( * ) Notice: Subject to any disclaimer, the term of this patent is extended or adjusted under 35 U.S.C. 154(b) by 1114 days.

(21) Appl. No.: 11/604,418

(22) Filed: Nov. 27, 2006

(65) Prior Publication Data
US 2007/0159998 A1 Jul. 12, 2007

(30) Foreign Application Priority Data
Dec. 23, 2005 (GB) .................................. 0526272.0

(51) Int. Cl.
*H04W 4/00* (2009.01)
(52) U.S. Cl. ....... 370/328; 370/338; 455/41.2; 455/557; 455/569.1; 455/90.2; 455/575.2
(58) Field of Classification Search .................. 455/41.2, 455/518, 552.1, 434, 557, 556.1; 370/328, 370/338
See application file for complete search history.

(56) References Cited

U.S. PATENT DOCUMENTS

| | | | | |
|---|---|---|---|---|
| 6,636,749 B2 * | 10/2003 | Holmes et al. | ............. | 455/569.2 |
| 6,865,371 B2 * | 3/2005 | Salonidis et al. | ............ | 455/41.1 |
| 6,961,541 B2 * | 11/2005 | Overy et al. | ................. | 455/41.2 |
| 7,089,033 B2 * | 8/2006 | Leinonen et al. | .......... | 455/553.1 |
| 7,107,010 B2 * | 9/2006 | Heinonen et al. | ............ | 455/41.2 |
| 7,174,131 B2 * | 2/2007 | Lee et al. | ...................... | 455/41.2 |
| 7,218,957 B2 * | 5/2007 | Katayama | ................. | 455/569.1 |
| 7,236,470 B1 * | 6/2007 | Bims | .............................. | 370/328 |
| 7,283,832 B2 * | 10/2007 | Jia et al. | ......................... | 455/517 |
| 7,656,847 B2 * | 2/2010 | Mela et al. | ..................... | 370/338 |
| 7,734,254 B2 * | 6/2010 | Frost et al. | .................... | 455/41.2 |
| 7,856,247 B2 * | 12/2010 | Rofougaran et al. | ...... | 455/552.1 |
| 7,877,115 B2 * | 1/2011 | Seshadri et al. | ........... | 455/569.1 |
| 8,023,893 B2 * | 9/2011 | Richman | ..................... | 455/41.2 |
| 2003/0035388 A1 | 2/2003 | Schmidt | ........................ | 370/329 |
| 2003/0118049 A1 | 6/2003 | Bender et al. | ................ | 370/466 |
| 2004/0204071 A1 * | 10/2004 | Bahl et al. | ..................... | 455/557 |
| 2006/0171445 A1 | 8/2006 | Batra et al. | .................... | 375/130 |
| 2006/0188003 A1 | 8/2006 | Larsson | ......................... | 375/130 |
| 2007/0105498 A1 * | 5/2007 | Steudle et al. | .............. | 455/41.2 |
| 2010/0304783 A1 * | 12/2010 | Logan et al. | ............... | 455/552.1 |

FOREIGN PATENT DOCUMENTS

| | | |
|---|---|---|
| CN | 1455570 | 11/2003 |
| KR | 2005-36861 | 4/2005 |
| KR | 2005-72443 | 7/2005 |
| WO | WO-2007/000739 A1 | 1/2007 |

* cited by examiner

*Primary Examiner* — Sharad Rampuria
(74) *Attorney, Agent, or Firm* — Harrington & Smith

(57) ABSTRACT

A communication device including a receiver for receiving information via a first radio protocol directly from a first communication device concerning at least a second radio protocol; and a controller for controlling communication of the communication device in dependence upon the received information.

25 Claims, 4 Drawing Sheets

EFFICIENT USE OF THE RADIO SPECTRUM

FIELD OF THE INVENTION

Embodiments of the present invention relate to efficient use of the radio spectrum.

BACKGROUND TO THE INVENTION

Currently Bluetooth radio communication devices detect other similar radios in the area by performing a Device Discovery procedure that includes the Inquiry procedure. The Bluetooth radio communication device sends an Inquiry message to which other Bluetooth devices in the area respond with an FHS packet.

Other communication devices measure energy on a communication channel and use this to predict possible radios in the area, but this method does not give any information of how the radio channel is being used. There are not even guarantees that the predicted radios actually exist. Furthermore, this process does not detect receiving radios.

BRIEF DESCRIPTION OF THE INVENTION

It would be desirable to improve how a radio communication device discovers how
other devices are using the radio spectrum, so that the radio spectrum can be used more efficiently.

According to one embodiment of the invention there is provided a communication device comprising: a receiver for receiving information via a first radio protocol directly from a first communication device concerning at least a second radio protocol; and a controller for controlling communication of the communication device in dependence upon the received information.

According to another embodiment of the invention there is provided a method of controlling communications at a communication device comprising: receiving information via a first radio protocol directly from a first communication device concerning at least a second radio protocol usable by the first device; and controlling communication of the communication device in dependence upon the received information.

Embodiments of the invention using informing as opposed to measurement to obtain knowledge of how the radio spectrum is being used. This saves power because each of the radios of a multi-radio device do not have to be started to detect similar radios in the area.

In addition, set-up and handover to other radio protocols are faster and more flexible, because some parameters can be communicated via the first protocol before the new radio protocol connection is formed.

BRIEF DESCRIPTION OF THE DRAWINGS

For a better understanding of the present invention reference will now be made by way of example only to the accompanying drawings in which.

DETAILED DESCRIPTION OF EMBODIMENTS OF THE INVENTION

The Figures illustrate a communication device $10_1$ comprising: a receiver for receiving information 37 via a first radio protocol directly from a first communication device $10_2$ concerning at least a second radio protocol; and a controller 14 for controlling communication of the communication device $10_1$ in dependence upon the received information 37.

Figure 1:
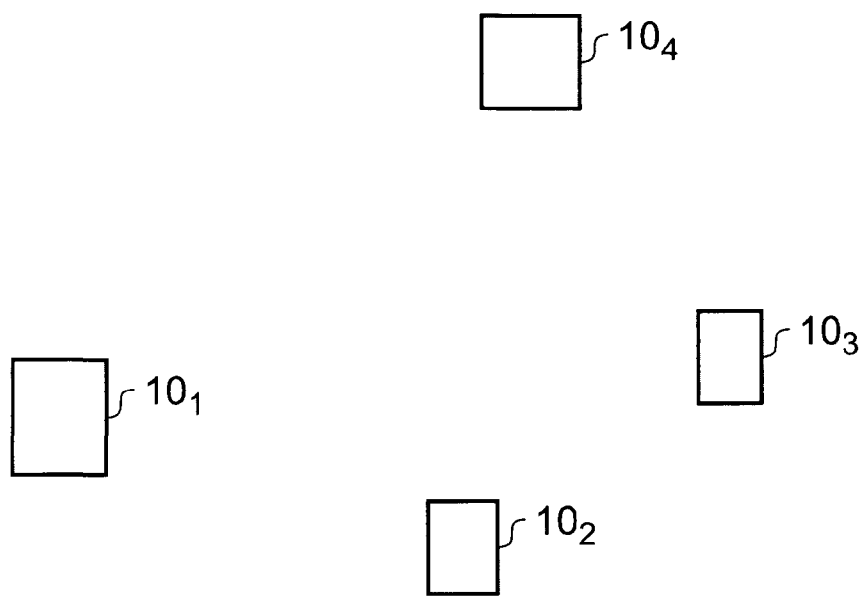
FIG. 1 illustrates a number of radio communication devices.

FIG. 1 illustrates a number of radio communication devices 10 at least some of which, including a first device $10_1$ and a second device $10_2$, are multi-radio communication devices. A multi-radio device is a device that has multiple radios that operate using different radio protocols. A device 10 is operable to send via one radio protocol information concerning all the radio protocols that the device supports. A device 10 is capable of receiving such multi-radio protocol information from a number of devices and of storing that information for future use. In particular it is used to select a most appropriate radio protocol for communication.

Figure 2:
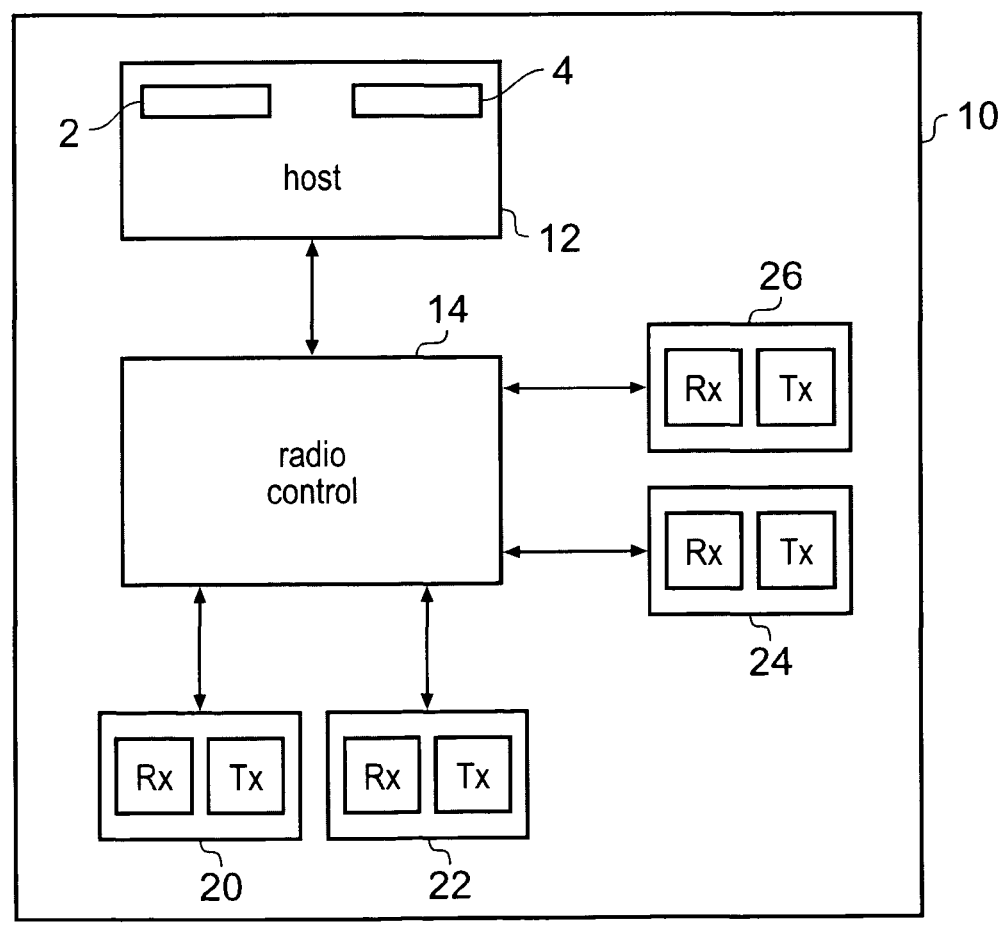
FIG. 2 schematically illustrates a typical multi-radio communication device.

FIG. 2 schematically illustrates a typical multi-radio communication device 10. The device 10 comprises a host 12, a radio controller 14 and several radios including a first radio 20, a second radio 22, a third radio 24 and a fourth radio 26. Although, four separate radios are illustrated it is possible that the device 10 comprises any number of radios. Although the radio controller 14 is illustrated as a separate entity from the host 12 for clarity, it may be implemented, for example, either as a separate hardware module or as part of the host as a software module. In the later case, computer program instructions are stored in a memory 2 of the host 12. These computer program instructions when loaded into a processor 4 of the host 12 provide the logic and routines that enable the host 12 to perform the functions of the radio controller 14 as described below.

The computer program instructions may arrive at the electronic device via an electromagnetic carrier signal or be copied from a physical entity such as a computer program product, a memory device or a record medium such as a CD-ROM or DVD.

In the example illustrated there are four separate radios illustrated. Each radio uses a different radio protocol. A 'radio protocol' in this document means the collection of rules governing the operation of a radio at the physical layer (L1) in the Open System Interconnection (OSI) layer model i.e. the rules that must be satisfied to convey a bit stream. The protocol, for example, specifies the modulation used, the multiple access techniques used (if any), the frequency band etc. Although two radio protocols may have overlapping frequency bands of operation they differ in other aspects of the physical layer. Typically a radio protocol uses its own transceiver, so each of the radios 20-26 has its own radio transceiver comprising a receiver part and a transmitter part. It is possible for radio protocols that operate at the same frequency to share antennas but it is more common for each radio 20-26 to have its own antenna. The radios may be provided as a self-contained radio module, which may be user replaceable.

In this example, the first radio 20 uses the Bluetooth communication protocol. This protocol uses fast frequency hopping and a frequency of 2.4 GHz.

In this example, the second radio 22 uses a 802.11g (Wi-Fi) communication protocol. This protocol uses a frequency of 2.4 GHz.

In this example, the third radio 24 uses a cellular telephone communication protocol such as GSM, PCS, CDMA, WCDMA, CDMA2000, PDC etc.

In this example, the fourth radio 24 uses an ultra wide band (UWB) communication protocol.

Other examples of possible radios include Wi-Max, DECT, etc.

The host 12 uses its processor 4 to run applications stored in its memory 2. The host 12, when necessary, requests the radio controller 14 to create/terminate radio communications for an application. The application may or may not request a particular radio protocol. Where the application does not request a particular radio protocol it provides one or more constraints that should be satisfied by the radio protocol assigned to the application. The constraint(s) may be, for example, any one or more of a minimum data rate, a minimum latency of set-up, a minimum quality of service, an estimated duration for the communication, etc The radio controller 14 controls the operation of the radios 20-26. For example, if scheduling between the different radios is needed, the radio controller 14 manages it. The radio controller 14 controls the creation of communication connections by the radios 20-26. It (or the host) determines whether a communication connection that is using one radio protocol should be changed to another radio protocol.

The radio controller 14 also stores an information element for each of its radios 20-26. When requested by another device, the radio controller sends all of its information elements to the requesting device via a message sent using a single radio protocol.

An information element typically includes parameters that identify the radio protocol it is related to, performance parameter(s), capacity parameter(s), operational frequency parameter(s) and communication parameters. These parameters are obtained and managed by the radio controller 14.

A radio protocol parameter may be used to identify the radio protocol (e.g. 0=WLAN, 1=GSM900 . . . )

Performance parameter(s) may be used to describe the current performance of a radio using the identified protocol. For example, a status parameter indicates whether the radio has activity (e.g. 0=connection, 1=no connection), an interval parameter indicates when the radio is active (e.g. 0|0=no regularity/not known, 20|5=every 20 ms active 5 ms), a packet error rate (PER) parameter indicates the average packet error rate which is detected for the radio link and a coexistence parameter indicates whether the radio has coexistence problems (interferences) with the other radios in the device (e.g. 0=no interferences, 1 some interferences, 2 a lot of interferences).

Capacity parameter(s) may be used to describe the current capacity available via the identified radio protocol. For example, a load parameter may indicate how much of the bandwidth is utilized (e.g. 50=50%), or how many bits/s are transmitted.

Operational frequency parameters may indicate the operating frequencies used by the indicated radio protocol.

Communication parameters may be used to provide parameters that are required to make a physical or logical connection. For example, the parameters for a Bluetooth device may include its Bluetooth Device address and clock offset.

Figure 3:
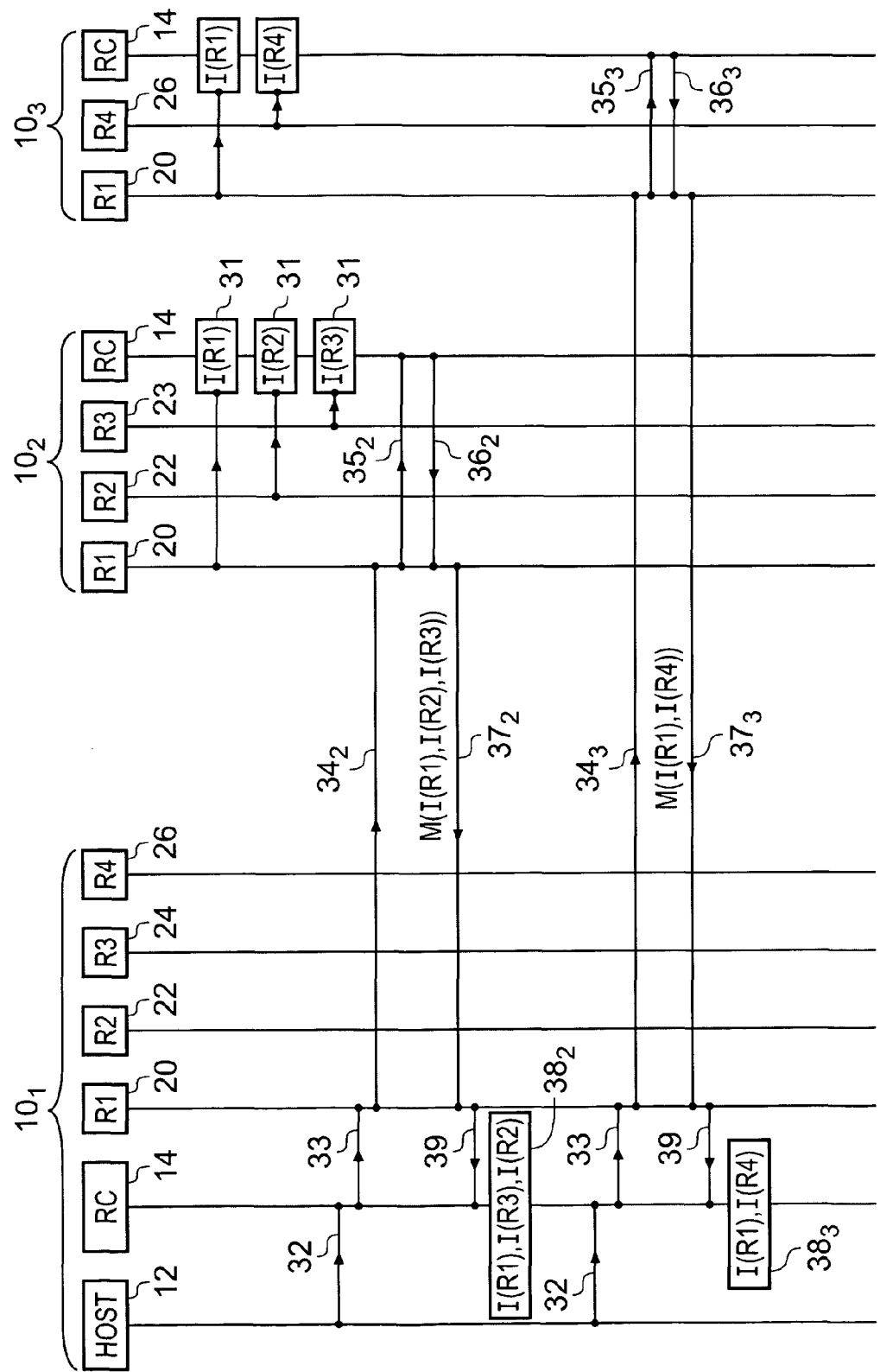
FIG. 3 illustrates a radio protocol discovery process performed by a first multi-radio device $10_1$.

As illustrated in FIG. 3, a first multi-radio device $10_1$ performs a radio protocol discovery process 30 on a second multi-radio device $10_2$ and a third multi-radio device $10_3$. Each of the second and third multi-radio devices has a radio controller 14 that stores and maintains an information element 31 for each of its radios. Each of the second and third multi-radio devices has a preferred radio protocol for transferring these stored information elements to other devices. In the illustrated example, the preferred radio protocol is the first radio protocol.

The host 12 of the first multi-radio device $10_1$ initiates a radio protocol information discovery process 30 via control message 32. This message indicates to the radio controller 14 that the discovery process should start.

The radio controller 14 sends a request message 33 to a predetermined one of the radios. In this example, the predetermined or preferred radio is the first radio 20.

The first radio 20 connects using the first radio protocol with each of the available devices that support this protocol and sends an information report request message 34 to each device.

When a device 10 receives an information report request message at its preferred radio, it forwards it 35 to its radio controller 14. The radio controller 14 accesses the information elements 31 it is storing and maintaining, which identify and characterize its available radio protocols, and sends the information elements 31 to the first radio as a information report reply message 36.

The first radio receives the information report reply message 36 and sends 37 it via the first radio protocol to the first radio 20 of the requesting device $10_1$. The first radio 20 of the requesting device $10_1$ forwards 39 the information report 37 to its radio controller 14, which stores as a collection 38 the information elements 31 contained within the report in association with an identifier of the device from which they were received.

Thus the radio controller 14 of the requesting device $10_1$ obtains and stores the information elements 31 of each of the available devices that use the first protocol.

Preferably all of the devices 10 use the first radio protocol as a preferred protocol. The first radio protocol can therefore be used as a control channel for sending information and for setting up communications on that or other radio protocols. A short range radio protocol such as Bluetooth is suitable for use as a shared preferred protocol and devices may default to using this as the preferred radio protocol when it is available.

However, in other embodiments, the available devices do not all support the first radio protocol. In this embodiment, the requesting device $10_1$ repeats the discovery process 30 but using the second radio protocol as the preferred protocol. After receiving, via the second radio protocol, the information elements from devices that use the second radio protocol as their preferred protocol, the requesting device $10_1$ repeats the discovery process 30 but using the third radio protocol as the preferred protocol. After receiving, via the third radio protocol, information elements from devices that use the third radio protocol as their preferred protocol, the requesting device $10_1$ repeats the discovery process 30 but using the fourth radio protocol as the preferred protocol. After receiving, via the fourth radio protocol, the information elements from devices that use the fourth radio protocol as their preferred protocol, the requesting device $10_1$ terminates the discovery process.

It will be appreciated that if every device performs the discovery process, then each device comprises the information elements of every other device. The collection 38 of the information elements 31 may be made more efficient, by enabling the requesting device $10_1$ to request via the first radio protocol not only the information elements of the device addressed but also all the collections of information elements 38 that the device stores.

A radio controller 14 of a device 10 uses the collections 38 of information elements it has collected to intelligently select a radio protocol for communication that is suitable in view of the circumstances or to select how a radio protocol is used in view of the circumstances.

For example, if the host opens a new application that has certain minimum communication requirements, these requirements (if any) are immediately communicated to the radio controller 14. The requirements may, for example, specify any one or more of: a minimum data rate, a minimum latency of set-up, a minimum quality of service, an estimated duration for the communication etc. These requirements are used as constraints by the radio controller 14 in the selection and set-up of a suitable radio protocol for the application.

The radio controller is also aware, via the stored collections 38 of information elements, of how other devices are using different radio protocols, what interference is present on each protocol, what data rate is available for each protocol etc. This information also represents constraints on the radio protocol selection problem.

A further constraint that may be used, in addition to the interference on signals transmitted/received by the device $10_1$ that is caused by other devices, is the interference caused by the device $10_1$ itself on other devices. The interference may not be symmetric. For example, if the device 10 has an UWB radio and there is a cellular telephone nearby, the UWB device $10_1$ may be capable of drowning the cellular downlink signal received at the telephone. However, the cellular radio telephone itself may not itself represent a source of interference to the device $10_1$.

A constraint concerning interference by others may be satisfied by selecting a different radio protocol and/or by selecting a non-overlapping operational frequency range. A constraint concerning interference on others may be satisfied by selecting a radio protocol that does not interfere and/or selecting a reduced power level and/or by selecting a non-overlapping operational frequency range.

A constraint concerning data rate, may be satisfied by selecting a radio protocol with sufficient available bandwidth. For example, if an information element associated with a device indicates that the available bandwidth for a second protocol is low, and the application requires a high bandwidth then communication will not occur with that device via the second protocol, assuming that the devices can use an alternative protocol that provides a higher bandwidth without causing adverse effects on other interfaces, like higher interference levels.

A constraint concerning latency may be satisfied by selecting a radio protocol with a quick set-up time.

It should be appreciated from the foregoing that although the invention is most useful for devices that have multiple radios, it can also be used by a device with a single radio as the requesting device and/or the responding device device. Such a single-radio device may use the information e.g. to detect whether the remote multi-radio device has active radios which cause interference to the single radio device and the characteristics of the interference. With such knowledge of the interference characteristics, single radio device may try to select e.g. frequencies which are not interfered with or schedule the transmission in a way that interference is mitigated.

In the foregoing example, a suitable radio protocol and set-up is selected for an application. It is possible for an application to use more that one radio protocol at a time. It is also possible for circumstances to change and a radio protocol and set-up that was considered most suitable at initiation may, over time become less suitable. The radio controller 14 therefore keeps its stored collections 38 of information elements 31 up to date by periodically performing the discovery process 30 and periodically re-testing the requirements for an open application against the available communication options. The updating of the collections 38 of information elements and the re-testing of the application requirements may also occur if there is a deterioration in the current communication connection assigned.

If the original radio protocol and set-up remains optimal then there is no change, however, if there is a better set-up or radio protocol then the radio controller hands over communication to the new set-up and/or radio protocol. A hysteresis may be introduced into the handover to prevent repeated switching.

The preferred first radio may be used to set-up and use another radio protocol. A connection using the first radio protocol is established quickly and then a handover to the optimal radio protocol and/or set-up occurs. The device sends a handover request via the first radio protocol that contains parameters to setup the desired connection with the other device. After the request has been accepted most probably more signaling is needed using the first radio protocol, e.g. to specify the time when the connection actually changes to other radio.

Figure 4:
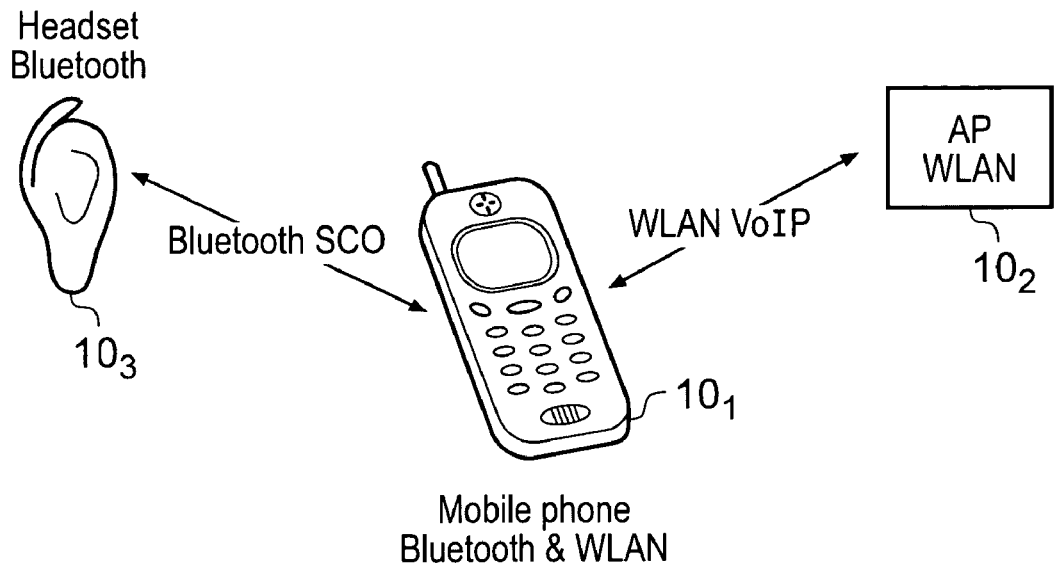
FIGS. 4, 5, 6 and 7 illustrate different configurations of a network.

FIG. 4 presents an example of a situation when a mobile telephone device $10_1$ has two simultaneous links with different radios between two devices. There is a voice over IP (VoIP) link using wireless local area network (WLAN-IEEE802.11) between an access point $10_2$ and the mobile phone $10_1$. There is a Bluetooth synchronous link between mobile phone $10_1$ and a headset device $10_3$. The Bluetooth link and WLAN link share the same frequency space (2.4 GHz). The mobile phone $10_1$ has to schedule transmissions, but some packets are lost because the transmission interval for VoIP and synchronous connection oriented logical transport (SCO) link are not the same, and the transmission/reception times overlap sometimes.

Figure 5:
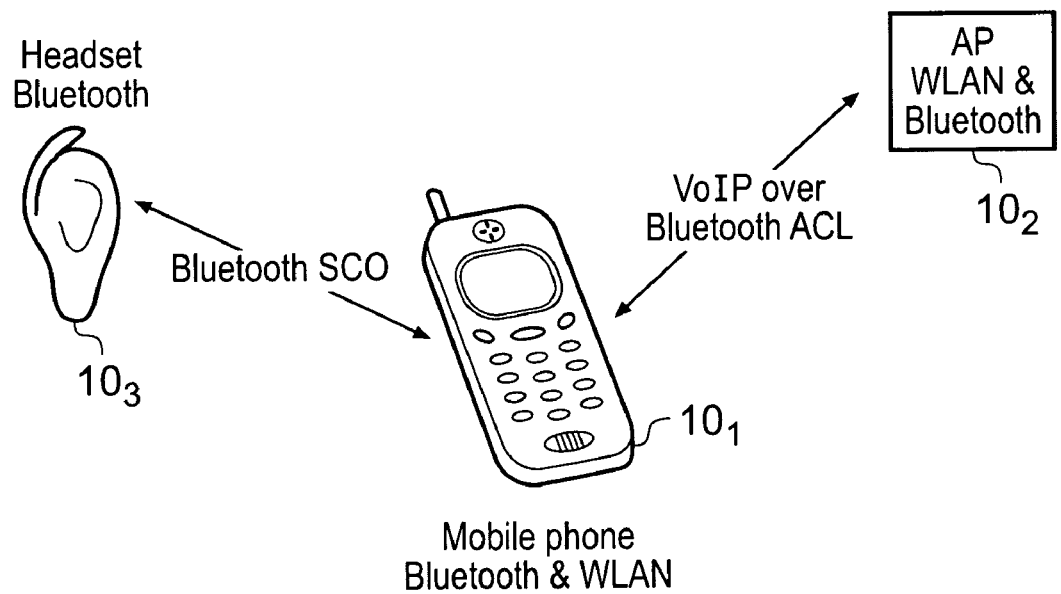

FIG. 5 presents a solution for the problem presented in FIG. 4. The mobile phone $10_1$ knows from the stored collections 38 of information elements obtained via the discovery process 30 described above that the access point $10_2$ also supports Bluetooth radio protocol. The mobile phone $10_1$ can request radio protocol handover from WLAN to Bluetooth. The link between the access point $10_2$ and the mobile telephone $10_1$ may be an asynchronous connection-oriented logical transport (ACL) link. Scheduling two Bluetooth links is easier than scheduling between two different radio protocols. The mobile phone 10 changes voice coding from VoIP to e.g. CVSD, which is suitable for Bluetooth SCO. The packets will not be lost because of overlapping transmission or reception times, especially if the mobile phone $10_1$ is master of a piconet containing the headset $10_3$ and access point $10_2$.

Figure 6:
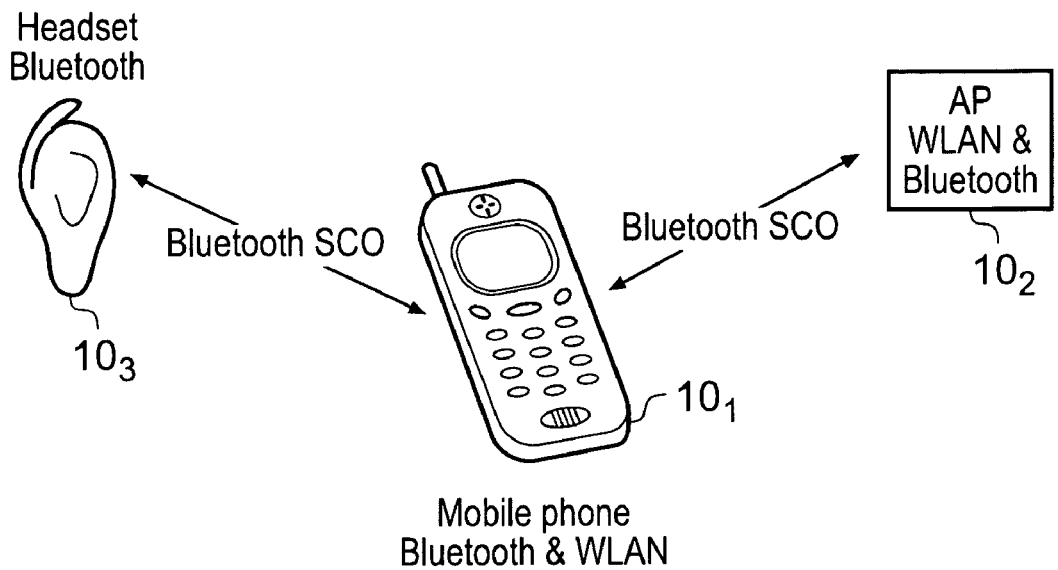

FIG. 6 presents another solution for the problem presented in FIG. 4. The mobile phone $10_1$ requests radio protocol handover from WLAN to Bluetooth, and also request the access point $10_2$ to use the SCO link. Scheduling two synchronous (e.g. using HV3 packets) Bluetooth links is easy if the mobile phone $10_1$ is the master of a piconet containing the headset $10_3$ and the access point $10_2$. Packets will not be lost because of overlapping transmission or reception times.

Figure 7:
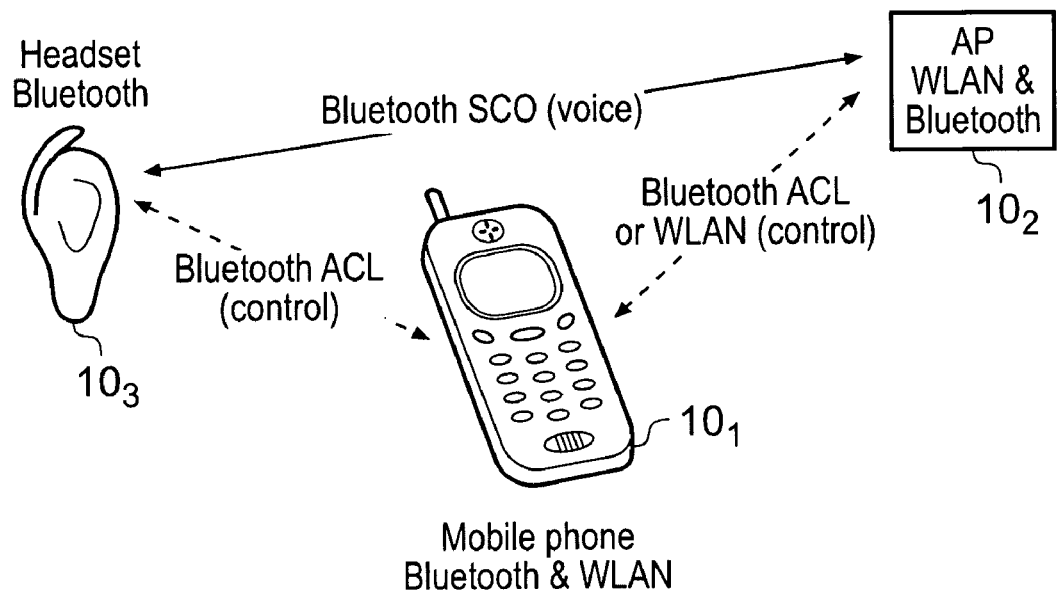

FIG. 7 presents another solution for the problem presented in FIG. 4. The mobile phone $10_1$ knows the radios that the headset $10_3$ and access point $10_2$ support from the stored collections 38 of information elements. In the presented case the mobile phone $10_1$ actually only routes the voice from access point $10_2$ to headset $10_3$. If the headset and access point support the same radio, the mobile phone $10_1$ can request that the access point $10_3$ and headset $10_2$ connect directly with each other using a common shared radio to exchange voice data. The request can be communicated over the preferred radio protocol. Mobile phone $10_1$ can still stay connected to both devices, for example via the preferred radio protocol, for controlling the call, i.e. the mobile phone is informed for example if the call is ended, or when the link between access point and headset deteriorates.

In the examples illustrated in FIGS. 5, 6 and 7, the mobile phone controls the connection made by the access point $10_2$. This is achieved for example by sending a Create_connection_to_device (radio, parameters, data_to_new_device, data_to_me) message to the access point $10_2$. The radio argument indicates the radio that the access point $10_2$ should use for the new connection. The parameters argument indicates the parameters of the device to which the access point $10_2$ should connect. They may include address, clock, type of device. The data_to_new_device parameter describes the data that should be directly communicated to the new device, e.g. voice. The data_to_me argument describes the data that should be directly communicated to the mobile phone $10_1$ e.g. control data.

The mobile phone sends Accept_connection_request (radio, parameters, data_to_new, data, to me) to the headset $10_2$. The parameters are the same as in previous command, except that the parameters now describe the access point which is creating (initiates) the new connection.

The remote devices can respond to these commands e.g. with accept or reject.

As an example of another implementation of the invention, the multi-radio device $10_1$ comprises a Bluetooth radio 20 and an UWB radio 22. It may comprise other radios but that is not important to this implementation.

A nearby first multi-radio device $10_2$ comprises a Bluetooth radio 20 and a cellular telecommunications radio 22 and/or a WLAN radio.

UWB (Ultra-wideband) is an acronym for an emerging radio technology involving low transmission power spread to a very wide system bandwidth. In radio frequency spectrum regulatory framework, UWB systems are classified to have >500 MHz system bandwidth.

UWB radio devices can cause interference in some situations such as when the devices are operated in close proximity to other radio receivers utilizing the same band. UWB devices pose a potential threat especially to future high bit-rate radio systems, often referred to as beyond 3G (B3G) systems, whose operating frequency range is assumed to be between 3 and 6 GHz. For future systems with higher frequencies, i.e. above 6 GHz, the interference may also be caused by the UWB harmonics.

A short distance between the interfering UWB device $10_1$ and the "victim" device $10_2$ causes an apparent interference effect. Since radio wave transmission attenuates rapidly as a function of propagation distance (power inversely proportional to distance squared), even relatively low interference transmission powers have a considerable remaining effect within close distances. Therefore, when a portable UWB device $10_1$ is placed very close to some other sensitive radio device $10_2$, severe interference will occur. In particular a UWB device $10_1$ is likely to interfere with weak cellular system downlink signals that a nearby mobile phone $10_2$ is trying to receive.

UWB systems have already been accepted by the US FCC (Federal Communications Commission), which allows effective operation approximately between 3 to 10 GHz frequencies with a maximum transmission power spectrum density of −41.3 dBm/MHz. Radio systems outside these operation frequencies are protected with somewhat more stringent transmission power limits. The European Communications Commission (ECC) is currently working on UWB regulation and it is to be expected that the allowed transmission power levels will be lower, especially at bands below 6 GHz, unless some interference mitigation techniques are used in the UWB devices.

The UWB device $10_1$ performs the discovery process 30 using the first (Bluetooth) radio protocol before communicating using UWB or before communicating using UWB above a certain power threshold. During the discovery process 30, the nearby multi-radio device $10_2$ provides an information element for its cellular telecommunications radio 22 and/or an information element for its WLAN radio (if any). The information element may, for example, indicate the cellular downlink signal strength (reception power) and the operating frequency used and also the Tx/Rx times or interval (if the cellular radio has Tx and Rx slots).

The radio controller 14 of the UWB device $10_1$ uses the received information elements to avoid, if possible, communication over a frequency range that overlaps with a frequency range or time slots used by a nearby device $10_2$. If this is not possible, the UWB device will if possible transmit with a reduced power level to mitigate interference or, if the victim device $10_2$ is particularly sensitive to interference, the UWB device will not transmit.

The potential victim radio device $10_2$ may also detect interference arising from the UWB device and can command the UWB device $10_1$, via the first radio protocol (Bluetooth), to control its transmissions.

Although embodiments of the present invention have been described in the preceding paragraphs with reference to various examples, it should be appreciated that modifications to the examples given can be made without departing from the scope of the invention as claimed.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
   at least one processor; and
   at least one memory including computer program code;
   the at least one memory and the computer program code configured to, with the at least one processor, cause the apparatus at least to:
   receive information via a first radio protocol directly from a first communication device concerning at least a second radio protocol capability of a second communication device, wherein the apparatus is external to the first and second communication devices, wherein the first and second communication devices are external to the apparatus, and wherein the first and second communication devices are external to each other; and
   control communication of the apparatus in dependence upon the received information, wherein the received information comprises at least one of the following parameters: performance parameter(s) for the second radio protocol, capacity parameter(s) for the second radio protocol, operational frequency parameter(s) for the second radio protocol and communication parameter(s) for the second radio protocol,
   wherein a transceiver is configured to request information from the first communication device before communicating using a third protocol, and wherein the received information comprises an indicator when the second radio capability of the second communication device is active.

2. The apparatus as claimed in claim 1, wherein a receiver is configured to receive information via the first radio protocol directly from the first communication device concerning each of the radio protocols supported by the first communication device.

3. The apparatus as claimed in 1, wherein a receiver is configured to receive information via the first radio protocol directly from the first communication device concerning radio protocols supported by each of a plurality of communication devices.

4. The apparatus as claimed in claim 1, wherein a receiver is configured to receive information separately, via the first radio protocol, from each of a plurality of further communication devices wherein the information received from a further communication device concerns radio protocols supported by that further communication device.

5. The apparatus as claimed in claim 1, wherein the received information comprises parameters usable for creating a new communication link.

6. The apparatus as claimed in claim 1, wherein the received information comprises parameters used for handing-over an existing communication channel from one radio protocol to another radio protocol.

7. The apparatus as claimed in claim 1, wherein the received information comprises parameters used for changing how communications are routed within a network.

8. The apparatus as claimed in claim 7, wherein the received information comprises parameters for excluding the first communication device as an intermediary routing node for data traffic in a network.

9. The apparatus as claimed in claim 7, wherein the received information comprises parameters for maintaining the first communication device as an intermediary node for control traffic in the network.

10. The apparatus as claimed in claim 1, wherein a controller is configured to control selection, in dependence upon the received information, of how a third radio protocol is used for communication.

11. The apparatus as claimed in claim 1, wherein a controller is configured to control selection, in dependence upon the received information, of how the second radio protocol is used for communication.

12. The apparatus as claimed in claim 1, wherein a controller is configured to control selection, in dependence upon the received information, of one of a plurality of radio protocols for communication.

13. The apparatus as claimed in claim 1, wherein a controller is configured to control selection, in dependence upon the received information, of one of a plurality of usable frequencies of a radio protocol for communication.

14. The apparatus as claimed in claim 10, wherein the selection is based upon interference.

15. The apparatus as claimed in claim 10, wherein the selection involves choice of any one or more of: a frequency band, transmission timing, a data rate, a latency for set-up and a transmission power level.

16. The apparatus as claimed in claim 1, wherein a controller is configured to control communication of the communication device in dependence upon the received information after the opening of a new application.

17. The apparatus as claimed in claim 1, wherein the first radio protocol is used as a control channel.

18. The apparatus as claimed in claim 1, wherein the first radio protocol is a low power, short range radio protocol.

19. The apparatus as claimed in claim 1, wherein the second radio protocol is a cellular telephone protocol.

20. The apparatus as claimed in claim 19, wherein the received information concerning at least a second radio protocol identifies the cellular telephone protocol downlink signal strength.

21. The apparatus as claimed in claim 1, wherein a receiver is configured to request information from the first communication device before communicating using a third protocol above a power threshold.

22. The apparatus as claimed in claim 1, wherein the third protocol is an ultra-wideband protocol.

23. The apparatus as claimed in claim 22 wherein a controller is configured to control the communication device to transmit according to the ultra-wideband protocol at a particular frequency and/or a particular power level.

24. A method comprising:
    receiving information at an apparatus via a first radio protocol directly from a first communication device concerning at least a second radio protocol capability of a second communication device, wherein the apparatus is external to the first and second communication devices, wherein the first and second communication devices are external to the apparatus, and wherein the first and second communication devices are external to each other; and
    controlling communication of the communication device in dependence upon the received information, wherein the received information comprises at least one of the following parameters: performance parameter(s) for the second radio protocol, capacity parameter(s) for the second radio protocol, operational frequency parameter(s) for the second radio protocol and communication parameter(s) for the second radio protocol,
    wherein a transceiver is configured to request information from the first communication device before communicating using a third protocol, and wherein the received information comprises an indicator when the second radio capability of the second communication device is active.

25. A non-transitory computer readable medium tangibly embodying computer program instructions which when loaded into a processor enable the method of claim 24.

* * * * *